United States Patent
Nakazawa

(10) Patent No.: US 8,126,350 B2
(45) Date of Patent: Feb. 28, 2012

(54) INFORMATION PROCESSING APPARATUS, IMAGE FORMING APPARATUS, AND JOB PROCESSING METHOD FOR THE SAME

(75) Inventor: Toshiyuki Nakazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 12/578,830

(22) Filed: Oct. 14, 2009

(65) Prior Publication Data

US 2010/0098450 A1    Apr. 22, 2010

(30) Foreign Application Priority Data

Oct. 21, 2008   (JP) ................. 2008-271169

(51) Int. Cl.
   *G03G 15/00*   (2006.01)
(52) U.S. Cl. .......................................... 399/82; 399/389
(58) Field of Classification Search .................. 399/81, 399/82, 85, 86, 389, 391
   See application file for complete search history.

(56) References Cited

FOREIGN PATENT DOCUMENTS

| JP | 2005-144927 A | 6/2005 |
|---|---|---|
| JP | 2005-266062 A | 9/2005 |

*Primary Examiner* — Hoang Ngo
(74) *Attorney, Agent, or Firm* — Canon USA, Inc., I.P. Division

(57) ABSTRACT

An information processing apparatus including an acquisition unit configured to acquire configuration information for each of a plurality of paper feed units including type and number of sheets of paper capable of storage in each paper feed unit, a generation unit configured to, based on type and number sheets of paper required to be used for an externally acquired print job and the configuration information acquired by the acquisition unit, generate paper allocation information for associating a paper feed unit with type and number of sheets of paper to be stored in the paper feed unit so as to reduce replacement of paper, an addition unit configured to add the paper allocation information generated by the generation unit to the print job, and a transmission unit configured to transmit the print job with the paper allocation information added by the addition unit to the image forming apparatus.

9 Claims, 18 Drawing Sheets 102, 104

FIG.8A
PAPER INFORMATION OF PRINT JOB (PAPER LIST)

| PAPER TYPE | SIZE | NUMBER OF SHEETS |
|---|---|---|
| COMPANY A HIGH QUALITY PAPER | A3 | 200 |
| COMPANY B NORMAL PAPER | A4 | 6000 |
| COMPANY B HIGH QUALITY PAPER | A4 | 3000 |
| COMPANY C COLORED PAPER (GREEN) | A4 | 400 |
| COMPANY D COATED PAPER | A4 | 400 |

FIG.8B
PAPER FEED INFORMATION OF PAPER FEED UNIT
IN IMAGE FORMING APPARATUS (PAPER FEED LIST)

| NAME OF PAPER FEED UNIT | MAXIMUM FEEDABLE PAPER SIZE | NUMBER OF FEEDABLE SHEETS |
|---|---|---|
| RIGHT DECK LOWER | A4 | 2000 |
| LEFT DECK LOWER | A4 | 2000 |
| RIGHT DECK UPPER | A4 | 5000 |
| LEFT DECK UPPER | A4 | 5000 |
| TRAY UPPER | A3 | 1000 |
| TRAY MIDDLE | A3 | 1000 |
| TRAY LOWER | A3 | 2000 |

FIG.8C
AUXILIARY PAPER FEED LIST

| PAPER TYPE | SIZE | NUMBER OF SHEETS |
|---|---|---|
| COMPANY B NORMAL PAPER | A4 | 1000 |

FIG.8D
ALLOCATION LIST

| NAME OF PAPER FEED UNIT | PAPER TYPE | SIZE | NUMBER OF SHEETS |
|---|---|---|---|
| TRAY UPPER | COMPANY A HIGH QUALITY PAPER | A3 | 200 |
| RIGHT DECK UPPER | COMPANY B NORMAL PAPER | A4 | 5000 |
| LEFT DECK UPPER | COMPANY B HIGH QUALITY PAPER | A4 | 3000 |
| RIGHT DECK LOWER | COMPANY C COLORED PAPER (GREEN) | A4 | 400 |
| LEFT DECK LOWER | COMPANY D COATED PAPER | A4 | 400 |
| TRAY MIDDLE | COMPANY B NORMAL PAPER | A4 | 1000 |

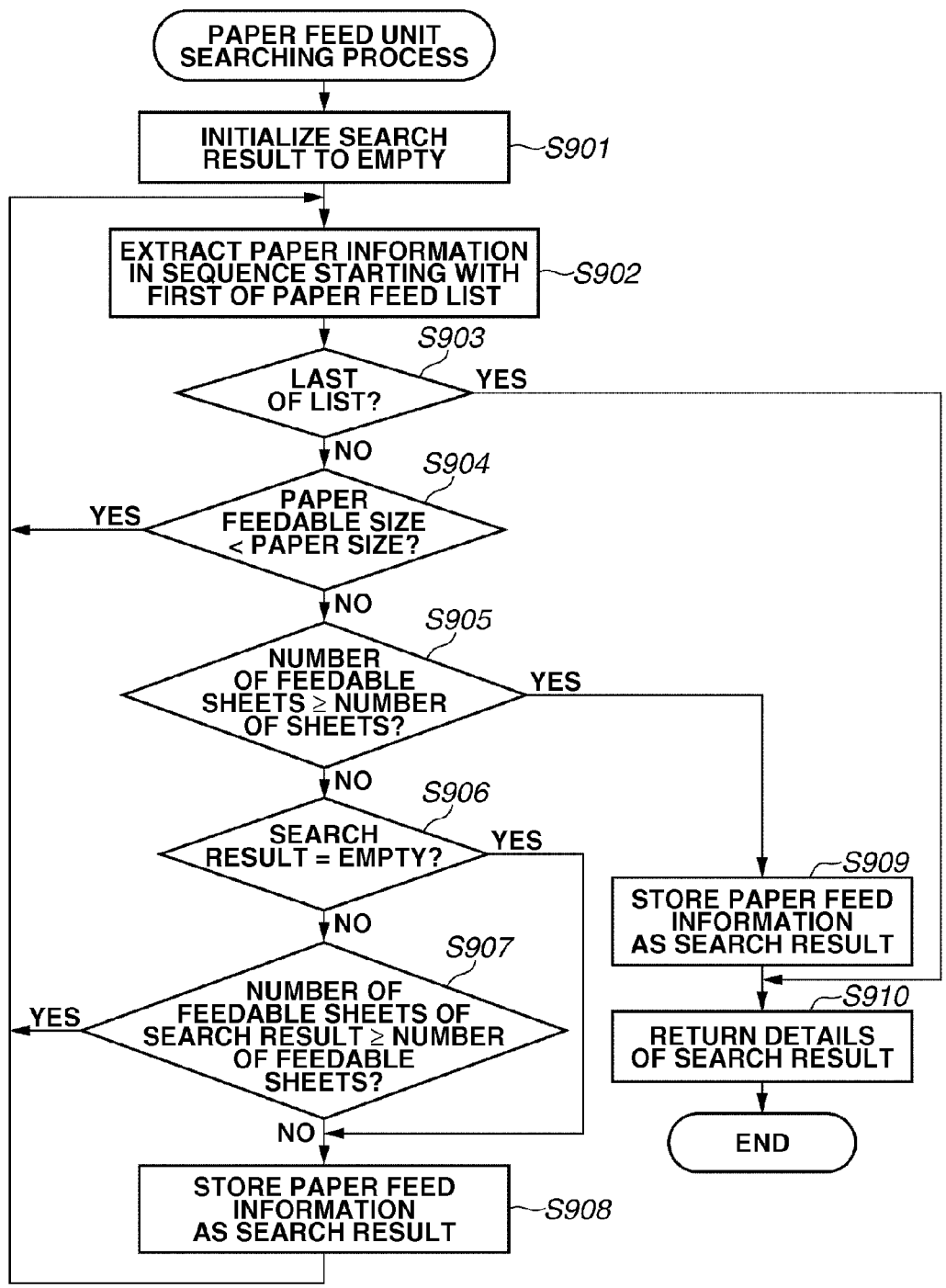

| LEFT DECK UPPER | COMPANY B HIGH QUALITY PAPER | A4 | 3000 | ~1009 |
| LEFT DECK LOWER | COMPANY D COATED PAPER | A4 | 400 | ~1010 |
| RIGHT DECK UPPER | COMPANY B NORMAL PAPER | A4 | 5000 | ~1011 |
| RIGHT DECK LOWER | COMPANY C COLORED PAPER (GREEN) | A4 | 400 | ~1012 |
| TRAY UPPER | COMPANY A HIGH QUALITY PAPER | A3 | 200 | ~1013 |
| TRAY MIDDLE | COMPANY B NORMAL PAPER | A4 | 1000 | ~1014 |

| LEFT DECK UPPER | COMPANY B HIGH QUALITY PAPER | A4 | 3000 | ~1109 |
| LEFT DECK LOWER | COMPANY D COATED PAPER | A4 | 400 | ~1110 |
| RIGHT DECK UPPER | COMPANY B NORMAL PAPER | A4 | 5000 | ~1111 |
| RIGHT DECK LOWER | COMPANY C COLORED PAPER (GREEN) | A4 | 400 | ~1112 |
| TRAY UPPER | COMPANY A HIGH QUALITY PAPER | A3 | 200 | ~1113 |
| TRAY MIDDLE | COMPANY B NORMAL PAPER | A4 | 1100 | ~1114 |

FIG.14A

PAPER FEED UNIT INFORMATION OF IMAGE FORMING UNIT

| NAME OF PAPER FEED UNIT | MAXIMUM FEEDABLE PAPER SIZE | NUMBER OF FEEDABLE SHEETS | PAPER TYPE | PAPER SIZE |
|---|---|---|---|---|
| RIGHT DECK LOWER | A4 | 2000 | COMPANY A NORMAL PAPER | A4 |
| LEFT DECK LOWER | A4 | 2000 | COMPANY A NORMAL PAPER | A4 |
| RIGHT DECK UPPER | A4 | 5000 | COMPANY B HIGH QUALITY PAPER | A4 |
| LEFT DECK UPPER | A4 | 5000 | COMPANY B ART PAPER | A4 |
| TRAY UPPER | A3 | 1000 | COMPANY C COLORED PAPER (YELLOW) | A4 |
| TRAY MIDDLE | A3 | 1000 | COMPANY A HIGH QUALITY PAPER | A3 |
| TRAY LOWER | A3 | 2000 | COMPANY A THICK PAPER | A4 |

FIG.14B

MATCHING PAPER FEED LIST

| NAME OF PAPER FEED UNIT | MAXIMUM FEEDABLE PAPER SIZE | NUMBER OF FEEDABLE SHEETS | PAPER TYPE | PAPER SIZE |
|---|---|---|---|---|
| RIGHT DECK UPPER | A4 | 5000 | COMPANY B HIGH QUALITY PAPER | A4 |
| TRAY MIDDLE | A3 | 1000 | COMPANY A HIGH QUALITY PAPER | A3 |

FIG.14C

MATCHING PAPER LIST

| PAPER TYPE | SIZE | NUMBER OF SHEETS |
|---|---|---|
| COMPANY A HIGH QUALITY PAPER | A3 | 200 |
| COMPANY B HIGH QUALITY PAPER | A4 | 3000 |

FIG.14D

ALLOCATION LIST

| NAME OF PAPER FEED UNIT | PAPER TYPE | SIZE | NUMBER OF SHEETS |
|---|---|---|---|
| TRAY MIDDLE | COMPANY A HIGH QUALITY PAPER | A3 | 200 |
| RIGHT DECK UPPER | COMPANY B HIGH QUALITY PAPER | A4 | 3000 |
| LEFT DECK UPPER | COMPANY B NORMAL PAPER | A4 | 5000 |
| RIGHT DECK LOWER | COMPANY C COLORED PAPER (GREEN) | A4 | 400 |
| LEFT DECK LOWER | COMPANY D COATED PAPER | A4 | 400 |
| TRAY UPPER | COMPANY B NORMAL PAPER | A4 | 1000 |

FIG.16

ALLOCATION LIST

| NAME OF PAPER FEED UNIT | PAPER TYPE | PAPER SIZE | NUMBER OF SHEETS | STATE |
|---|---|---|---|---|
| LEFT DECK UPPER | COMPANY B NORMAL PAPER | A4 | 5000 | CHANGE |
| LEFT DECK LOWER | COMPANY D COATED PAPER | A4 | 400 | CHANGE |
| RIGHT DECK UPPER | COMPANY B HIGH QUALITY PAPER | A4 | 3000 | NO CHANGE |
| RIGHT DECK LOWER | COMPANY C COLORED PAPER (GREEN) | A4 | 400 | CHANGE |
| TRAY UPPER | COMPANY B NORMAL PAPER | A4 | 1000 | CHANGE |
| TRAY MIDDLE | COMPANY A HIGH QUALITY PAPER | A3 | 200 | NO CHANGE |

| LEFT DECK UPPER | COMPANY B NORMAL PAPER | A4 | 5000 | ~1709 |
| LEFT DECK LOWER | COMPANY D COATED PAPER | A4 | 400 | ~1710 |
| RIGHT DECK UPPER | COMPANY B HIGH QUALITY PAPER | A4 | 3000 | ~1711 |
| RIGHT DECK LOWER | COMPANY C COLORED PAPER (GREEN) | A4 | 400 | ~1712 |
| TRAY UPPER | COMPANY B NORMAL PAPER | A4 | 1000 | ~1713 |
| TRAY MIDDLE | COMPANY A HIGH QUALITY PAPER | A3 | 200 | ~1714 |

INFORMATION PROCESSING APPARATUS, IMAGE FORMING APPARATUS, AND JOB PROCESSING METHOD FOR THE SAME

BACKGROUND OF THE INVENTION

1. Field of the Invention

The present invention relates to an image forming system configured to receive print jobs from an information processing unit and to perform image processing in an image forming apparatus which includes a plurality of paper feed units.

2. Description of the Related Art

Improvements to the performance of digital multifunction peripherals and printers have resulted in increased use of such image forming apparatuses in Print On Demand (POD). These types of image forming apparatuses applying POD include finisher functions, such as saddle stitch binding, case binding, and side stitching and staple binding, and often perform the series of operations from printing to binding.

POD applications sometimes use different types of paper for pages such as the cover, color pages or monochrome pages. The image forming apparatus includes a plurality of paper feed units and records the paper type of each paper feed unit. The combination of paper type and the respective pages in a print job is stored and the image forming apparatus searches the paper feed units for a paper type stated in the print job and feeds the paper from the paper feed unit for printing operations when the required paper type is available in the paper feed unit.

When the paper type required for the print job is not available in the paper feed unit, the operation unit of the image forming apparatus either displays a corresponding error message and terminates the printing operation, or performs the printing operation after determining an availability of a similar paper type to the designated paper type.

Japanese Patent Application Laid-Open No. 2005-266062 discusses a method related to the correlation of a paper type and paper feed unit in which an operation unit of the image forming apparatus designates the combination.

Japanese Patent Application Laid-Open No. 2005-144927 discusses a method of prompting a user to replace paper when the paper feed unit has not been opened and closed after a change in the paper setting to prevent image formation on the wrong type of paper.

These methods do not consider the required number of sheets for the print job which an information processing apparatus outputs to the image forming apparatus. Consequently, when, for example, the designated paper is set to a paper feed unit without a storage capacity for the required number of sheets for processing the print job, paper will run out during the printing process, thereby placing a burden on a user.

When operations from printing to binding are performed using a single image forming apparatus, the operation includes a mixture of pages such as the cover, color pages, monochrome pages or the Z-fold page. When the paper type is not adapted to the paper feed unit (cassette and deck), printing and copying will be performed using incorrect paper and result in lost costs.

More specifically, if the linkage of a cassette with the actual paper is not correctly executed in an image forming apparatus, when the required paper type for the print job is not available, another type of paper with the same size in the image forming apparatus is used. In this manner, when a print job is executed which should be performed using art paper of Company A in a certain cassette, the actual paper used for image formation may be copying paper from Company B.

Furthermore when the number of feedable sheets of the cassette in the image forming apparatus is not sufficient for the number of sheets required in the print job, an operator must supplement the paper on several occasions during the execution of the print job. For example, when printing a copy requested in the print job, although the specified number of sheets requires a total of 5000 sheets, if the paper is set to a cassette with a capacity of 500 sheets, the operator will have a troublesome operation of supplementing the paper at least on 10 occasions.

SUMMARY OF THE INVENTION

The present invention is directed to a method of reducing the frequency of a paper-out during a printing operation, thereby reducing an operational burden such as supplementing paper and monitoring paper use on a user.

According to an aspect of the present invention, an information processing apparatus configured to output a print job using paper stored in a plurality of paper feed units to an image forming apparatus includes an acquisition unit configured to acquire configuration information for each paper feed unit including type and number of sheets of paper capable of storage in each paper feed unit, a generation unit configured to, based on type and number sheets of paper required to be used for an externally acquired print job and the configuration information acquired by the acquisition unit, generate paper allocation information for associating a paper feed unit with type and number of sheets of paper to be stored in the paper feed unit in such a way as to reduce replacement of paper, an addition unit configured to add the paper allocation information generated by the generation unit to the print job, and a transmission unit configured to transmit the print job with the paper allocation information added by the addition unit to the image forming apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8A to 8D illustrate an example of management information stored by the information processing apparatus.

FIG. 9 is a flowchart illustrating an example of a data processing sequence in the information processing apparatus.

FIG. 14A to 14D illustrate an example of a paper feed information list of the image forming apparatus managed by the information processing apparatus.

FIG. 16 illustrates an example of an allocation list for the image forming apparatus.

DESCRIPTION OF THE EMBODIMENTS

Various exemplary embodiments, features, and aspects of the invention will be described in detail below with reference to the drawings.

Figure 1:
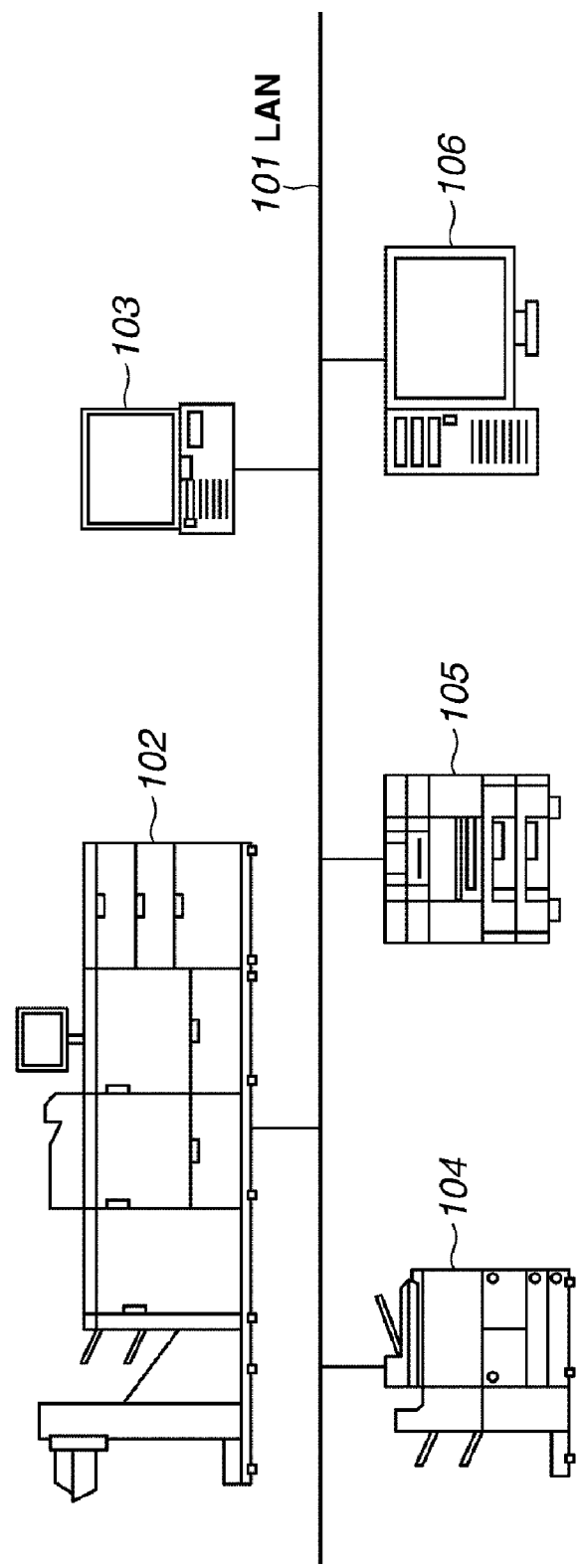
FIG. 1 illustrates the configuration of a printing system including an image forming apparatus according to a first exemplary embodiment of the present invention.

FIG. 1 illustrates the configuration of a printing system including an image forming apparatus according to a first exemplary embodiment of the present invention. This example illustrates an image forming system using a local area network (LAN) 101 to communicate with an image forming apparatus, host computer 103 and a server apparatus 106. Although this exemplary embodiment describes an image forming apparatus including an image forming apparatuses 102, 104 and a printer 105, the configuration of the system is not limited in this regard. In the description hereafter, the digital copying machine and the printer will be described as the image forming apparatus 102, 104, or 105.

The image forming apparatus 102 is employed in POD and includes a plurality of paper feed units to output the different pages specified by the print job as types of paper. Furthermore, the remaining amount of paper stored in the paper feed units storing the various types of paper can be detected.

In FIG. 1, the print job is analyzed using a print job analysis program (hereafter "analysis software") operated by the host computer 103, information is added, and the print job is sent to the image forming apparatus 102.

The image forming apparatus 102 analyzes and processes the received print job and executes printing operations with paper supplied by an engine unit.

Management software operated by the server apparatus 106 manages the image forming apparatuses 102, 104, and 105 connected to the network 101.

More specifically, the server apparatus 106 uses a management software function to acquire information indicating a configuration of the paper feed units provided in the image forming apparatus. The management server 106 performs processes such as setting and acquiring allocation information for the paper type and paper feed unit, and usable paper information in the image forming apparatus from the image forming apparatus.

Figure 2:
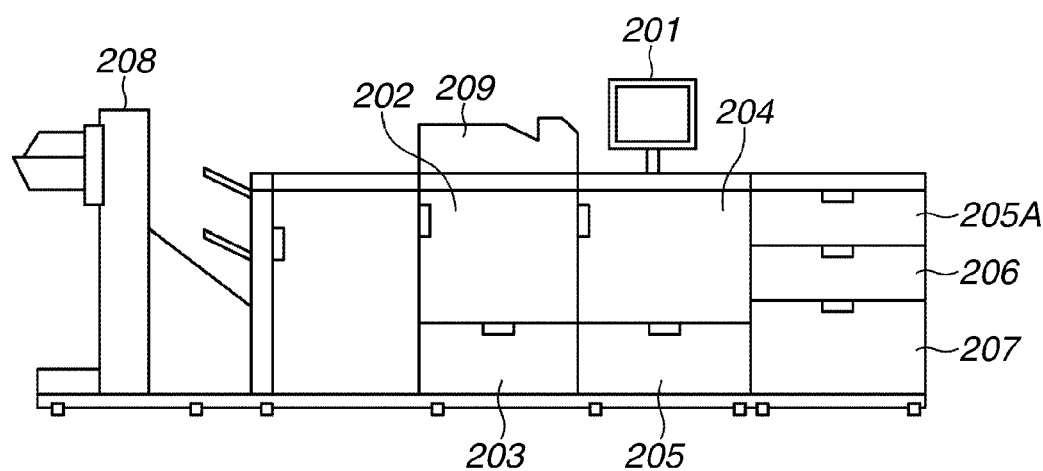
FIG. 2 illustrates the configuration of the image forming apparatus illustrated in FIG. 1.

FIG. 2 illustrates a configuration of the image forming apparatus 102 illustrated in FIG. 1.

In FIG. 2, an operation unit 201 is configured using types of operating switches and a display unit. This example assumes a method in which operating buttons are displayed on the display unit in the form of a touch panel, and a sensor on the screen detects the depression of the screen.

Paper feed units 202, 203, 204, 205, 205A, 206, and 207 are configured to store paper for printing operations and supplying the paper to an engine unit via a paper feed route (not illustrated) in response to commands from a controller described below.

A finisher 208 is configured to perform sheet post-processing, such as saddle stitch binding, case binding, or stapling. A reader unit 209 is configured to read a document image.

Figure 3:
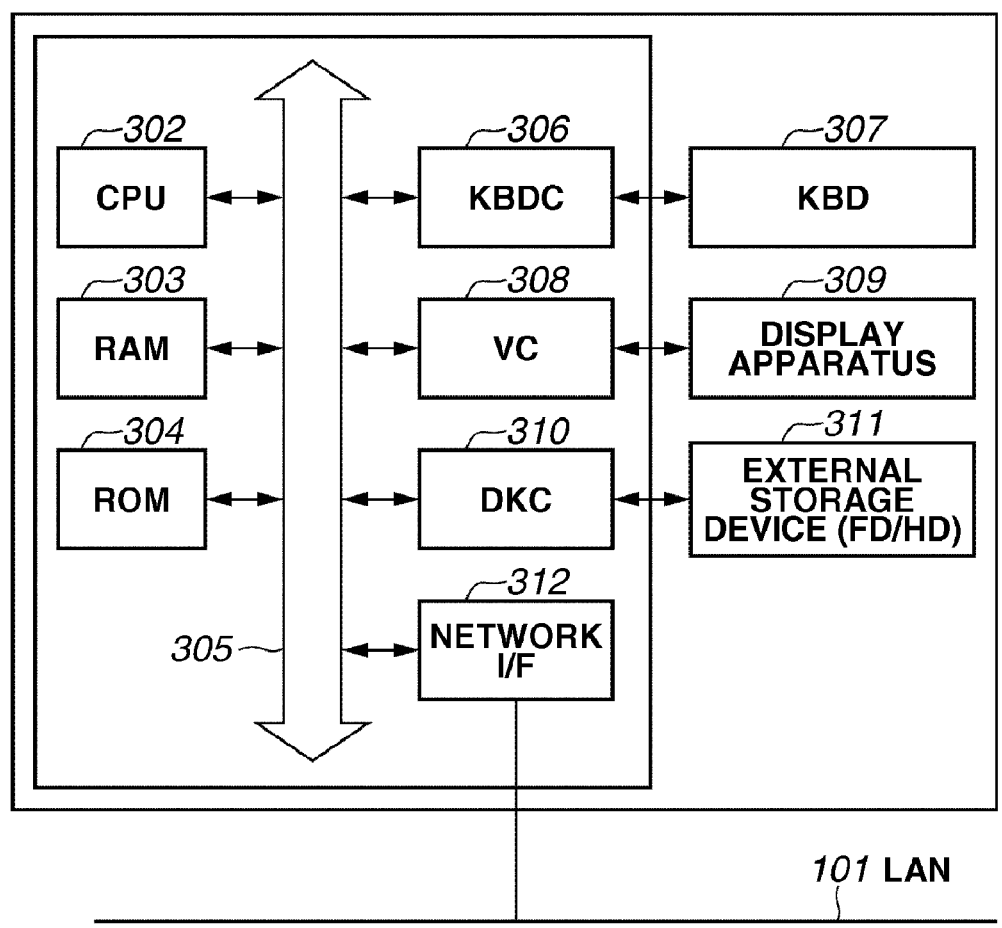
FIG. 3 is a block diagram illustrating a hardware configuration of a host computer and server apparatus illustrated in FIG. 1.

FIG. 3 is a block diagram illustrating a hardware configuration of the host computer 103 and the server apparatus 106 illustrated in FIG. 1.

In FIG. 3, the host computer 103 or the server apparatus 106 includes a central processing unit (CPU) 302, random access memory (RAM) 303, read only memory (ROM) 304, and an external storage device 311.

The CPU 302 executes software stored in the ROM 304 or the external storage device 311, thereby enabling overall control of each device connected to a system bus 305.

The RAM 303 functions as the work area or the main memory for the CPU 302. The external storage device 311 includes a hard disk (HD) and a floppy disk (FD).

The external storage device 311 stores various types of applications, databases, font data, user files, and the like including boot programs, operating systems, authentication servers, and authentication clients.

In the host computer 103 or the server apparatus 106, a keyboard controller (KBDC) 306 sends input information from the keyboard (KBD) 307 or a pointing device (not illustrated) to the CPU 302.

A video controller (VC) 308 controls display operations on a display apparatus 309 which includes a cathode ray tube (CRT) or liquid crystal display (LCD). A disk controller (DKC) 310 controls access with the external storage device 311. A communication controller (network I/F) 312 forms a connection with the local area network (LAN) 101.

Figure 4:
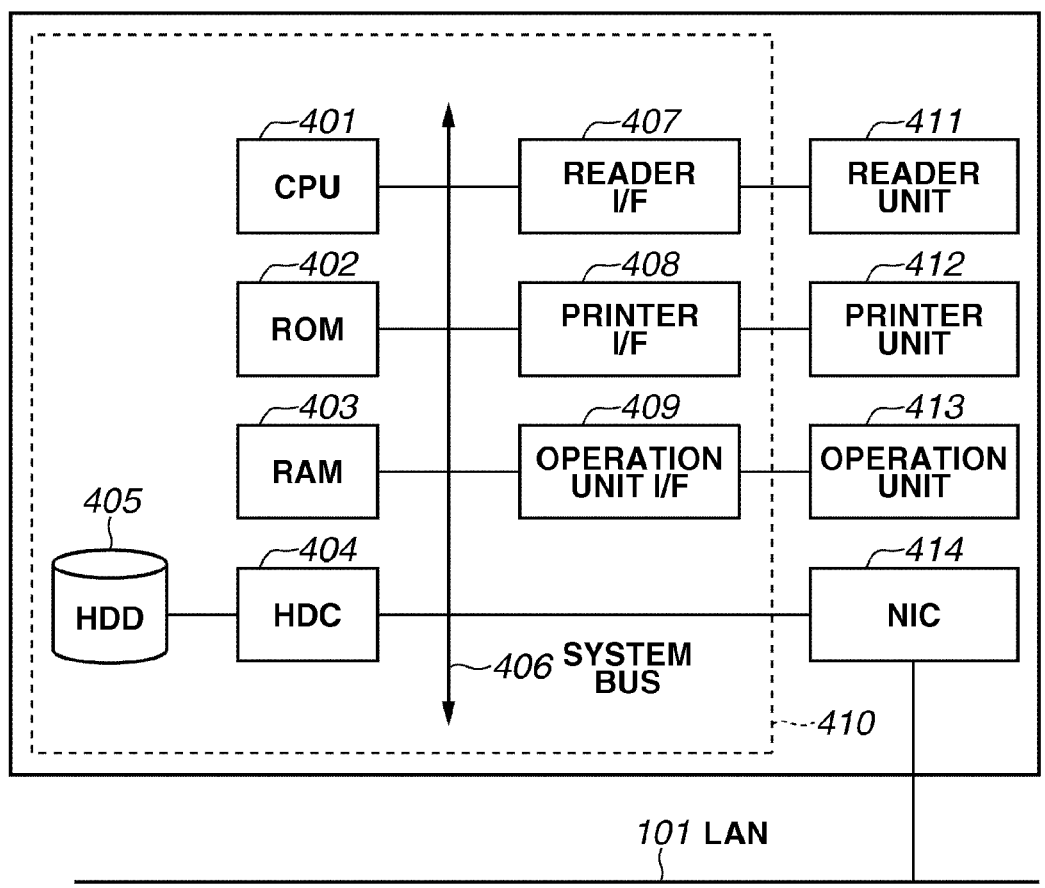
FIG. 4 is a block diagram illustrating the configuration of the image forming apparatus illustrated in FIG. 1.

FIG. 4 is a block diagram illustrating the configuration of the image forming apparatus 102 or 104 illustrated in FIG. 1.

In FIG. 4, the CPU 401 controls the digital copying machine by executing software stored in the hard disk (HDD) 401 or the ROM 402, thereby performing overall control of each device connected to a system bus 406.

The RAM 403 functions as a work area for the CPU 401. The hard disk controller (HDC) 404 controls the hard disk 405.

A reader I/F 407 and a reader I/F 408 are respectively connected to a reader unit 411 and a printer unit 412 and control the respective disks. An operation unit I/F 409 is connected to an operation unit 413 and controls user inputs from a display to the operation unit 413 or from the operation unit 413.

The operation unit 413 is configured by operating switches and a display unit. A network interface card (NIC) 414 handles data with the host computer via the network 101.

The section encircled by the broken line in FIG. 4 is referred to as an overall control unit 410. The overall control unit 410 controls the interface and various apparatuses connected to the digital copying machine as well as controlling the operation of the overall digital copying machine.

The reader unit 411 reads document images and outputs image data corresponding to the document image to a printer unit 412 in response to commands from a user, or stores the data in a hard disk 405, which is the storage apparatus for the image forming apparatus.

The reader unit 411 can send image data to the host computer 103, which is connected to the network 101 by the NIC 414.

The printer unit 412 prints image data stored in the hard disk 405 of the image forming apparatus or documents read by the reader unit 411. The printer unit 412 also receives print jobs from the host computer 103 connected to the network 101 via the NIC 414 and prints the print jobs.

The NIC 414 is connected to the network 101, and the overall control unit 410 is used for communication between other information units on the network 101, for example, the document management server or the client PC.

The operation unit 413 uses a button and display apparatus, or a liquid crystal display screen with a touch pad input, or a combination thereof to notify the overall control unit 410 of a user input or to notify a user of an information display from the overall control unit 410.

Figure 5:
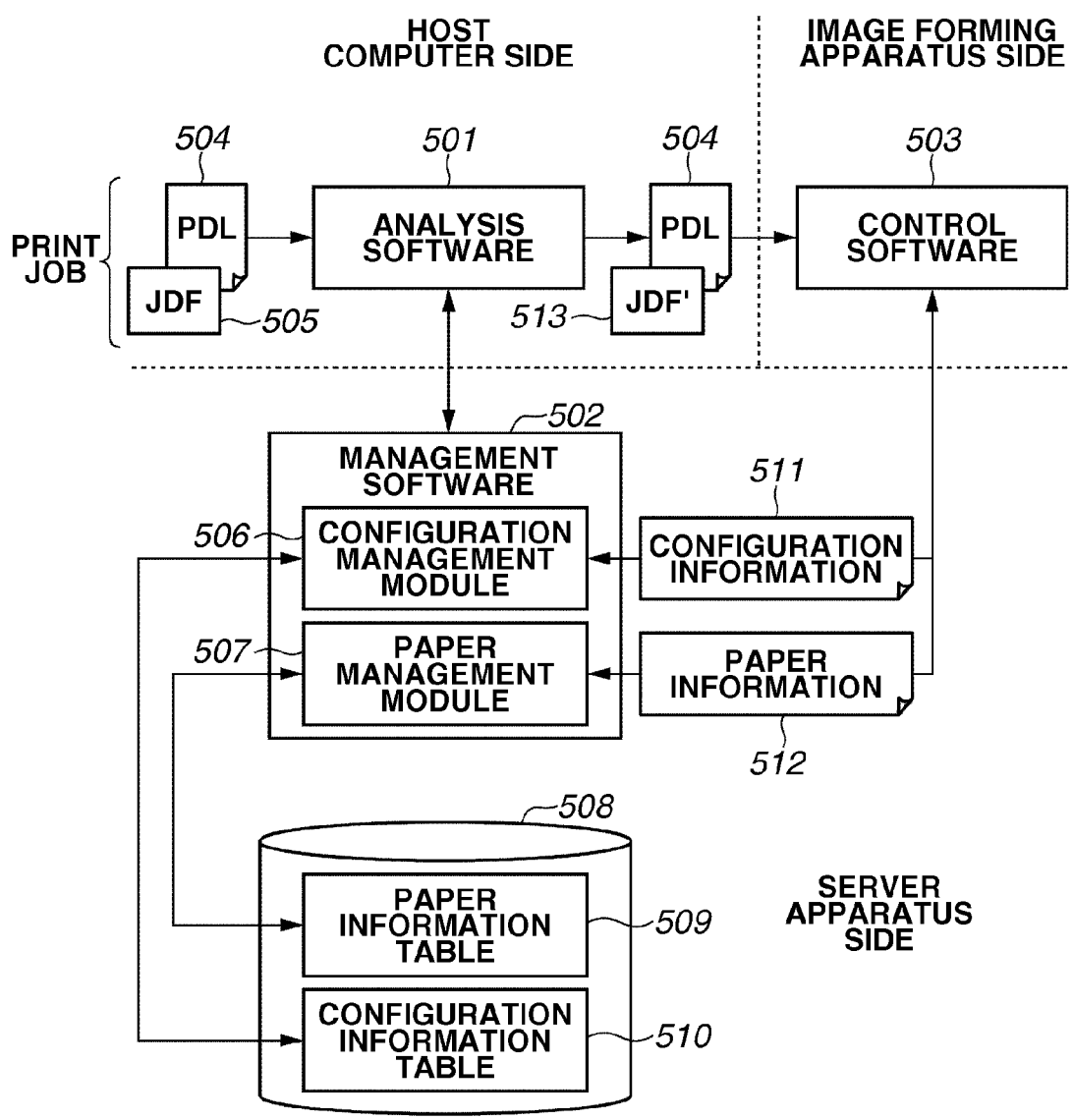
FIG. 5 is a conceptual view illustrating the flow of printing processing in the printing system.

FIG. 5 is a conceptual view illustrating the flow of printing processing in the printing system according to the present exemplary embodiment.

In FIG. 5, analysis software 501 is a program executed by the CPU in the host computer 103. Management software 502 is a program executed by the CPU in the server apparatus 106. Control software 503 is a program executed by the CPU in the image forming apparatus 102.

A configuration management module 506 and a paper management module 507 are provided in the management software 502. In the description hereafter, the execution a program, module or process means the execution by the various CPUs of a sequence stored in a storage unit such as a HDD, RAM, or ROM provided in the host computer, server apparatus, or image forming apparatus.

The configuration management module 506 receives configuration information 511 from an image forming apparatus on the network 101, for example, the image forming apparatus 102. Then, the configuration management module 506 stores the received configuration information 511 with assignment of an identifier uniquely specifying the image forming apparatus 102 in a configuration information table 510 in a database 508.

Information related to a paper feed unit provided in the image forming apparatus 102 such as the number of feedable sheets or the maximum feedable paper size is included in the configuration information 511. The management software 502 sends the configuration information of the designated image forming apparatus in response to a request from the analysis software 501 operated on the host computer 103 on the network.

The paper management module 507 acquires paper information 512 defined in an image forming apparatus on the network 101, for example, the image forming apparatus 102. Alternatively, paper information 512 is sent for addition to the definition of paper information in the image forming apparatus 102.

Information, such as positional correction values during image forming, presence or absence of surface codes, the weight per unit surface area, color, size, name of paper, etc., is included in the paper information 512. The paper management module 507 manages and stores paper information in the paper information table 509 in the database 508. A table for recording a correlation between the image forming apparatus and the paper type defined in the image forming apparatus is provided in the database 508.

The paper management module 507 sends a list of paper information in the designated image forming apparatus in response to a request from the analysis software 501 operating in the host computer 103 on the network 101. Alternatively, a command is output to add the designated paper information to the definition of paper information in the designated image forming apparatus in response to a request from the software operating in the host computer 103 on the network 101.

The analysis software 501 receives a print job in job definition format (JDF) 505 as described hereafter, which includes information (printing settings and log information etc.) related to the printing operation and the printing data 504.

The analysis software 501 analyzes the received print job, calculates the type and number of sheets of paper required for printing and uses the paper information or configuration information for the image forming apparatus 102 for printing the print job to determine an optimal allocation of paper and paper feed units. As described below, although the analysis software 501 executes allocation processing by acquiring information for an image forming apparatus managed by the management software 502, the software 501 may also acquire information regarding paper feed units or the paper information directly from the image forming apparatus itself.

Next, the analysis software 501 prepares (regenerates) a JDF' 513 adding the allocation of paper and paper feed units to the JDF 505 and sends the information together with the printing data 504 to the image forming apparatus 102.

The control software 503 of the image forming apparatus 102 receives the print job from the analysis software 501 and executes the printing process. Alternatively, a request is received from the management software 502, and transmission of paper information or configuration information, or addition to the definition of paper information is performed in response to the request.

Figure 6:
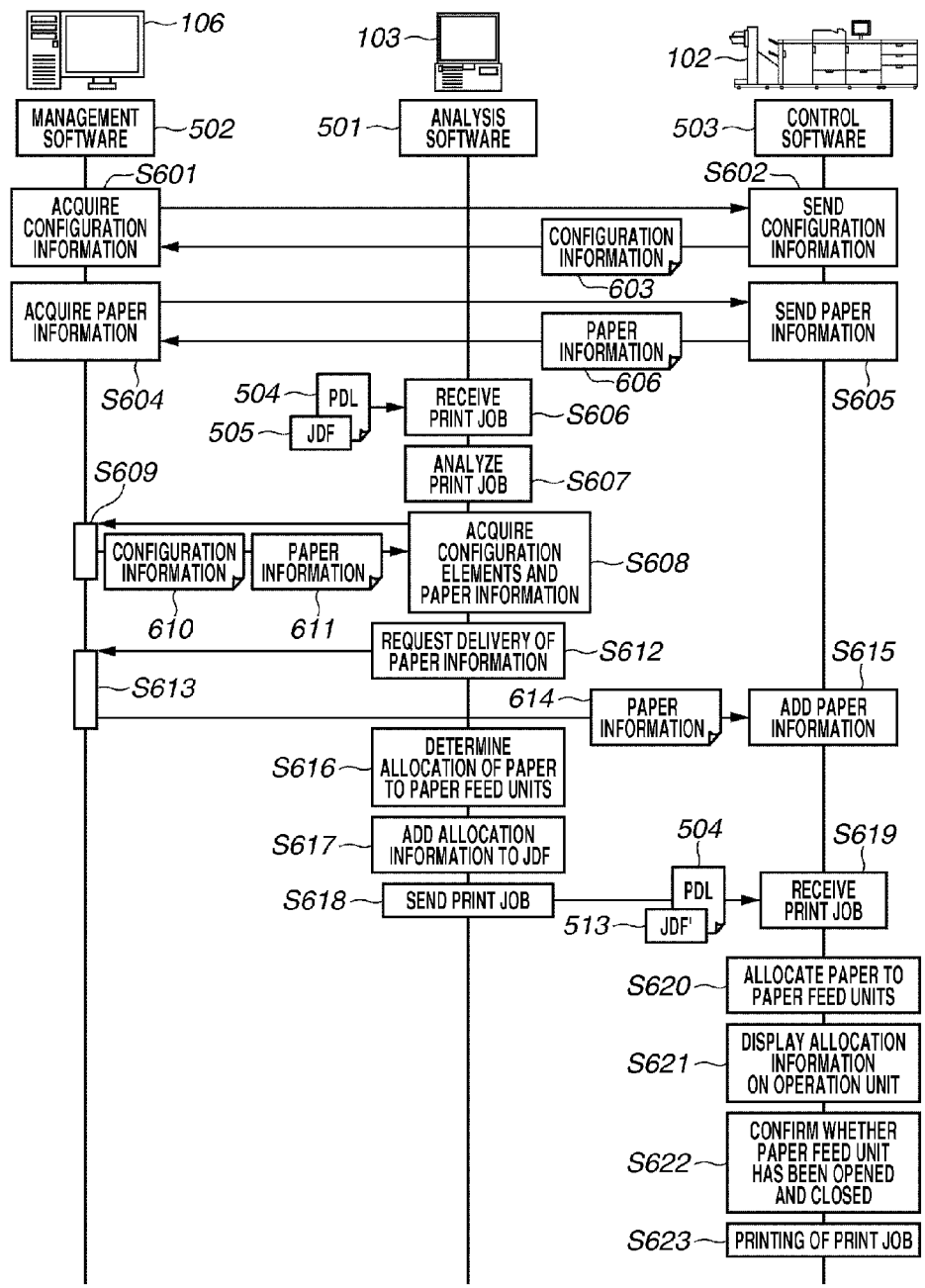
FIG. 6 illustrates the data processing flow in the printing system.

FIG. 6 illustrates the data processing flow in the printing system according to the present exemplary embodiment. The present example describes the sequence of Unified Modeling Language (UML) expressing the overall flow of the job processing from input of the print job to the host computer 103 illustrated in FIG. 1 to the printing operation by the image forming apparatus 102. The process illustrated in the figure will be described with reference to the passage of time.

In step S601, the management software 502 of the server apparatus 106 generates an acquisition request for configuration information 603 in the image forming apparatus 102 in response to a user command. In step S602, the image forming apparatus 102 responds by sending configuration information 603 to the server apparatus 106. The management software 502 stores the configuration information 603 acquired from the image forming apparatus 102 in the configuration information table 510 in the database 508. The configuration information 603 includes each paper feed unit of the current image forming apparatus and the matching information (right deck, normal paper from Company B) for paper type stored in the paper feed units.

The management software 502 generates an acquisition request to the image forming apparatus 102 in response to a user command for paper information 606 indicating a list of paper information which can be used by the image forming apparatus 102. Then in step S605, the image forming apparatus 102 receives an acquisition request for paper information and sends the matching paper information 606 to the server apparatus 106. The management software 502 stores the paper information 606 acquired from the image forming apparatus 102 in the paper information table 509 in the database 508 in response to the acquisition request.

These processes are executed independently of the print job processes executed by the analysis software 501 in the host computer 103. Furthermore, these acquisition processes may be performed periodically. In addition to information acquisition in response to acquisition requests from the management software 502, the system may be adapted so that such information is sent upon updating.

The analysis software 501 in the host computer 103 receives the print job in step S606. The print job may be input from another PC for example on the network or may be input from an external storage device, such as a floppy disk (FD), USB memory, hard disk, or compact disc, of the host computer 103.

The print job is configured as print data 504 and Job Definition Format (JDF) 505 storing information related to the data 504.

In step S607, the analysis software 501 analyzes the received print job and uses the printing data 504 and JDF 505 to calculate the type and number of sheets of paper required for completing the received print job.

In step S608, the analysis software 501 sends a request to the management software 502 for configuration information and paper information for the image forming apparatus 102 handling the print job. The management software 502 receives the request, and in step S609, sends configuration information 610 and paper information 611 for the image forming apparatus 102 acquired in step S601 and step S604 to the analysis software 501.

In step S612, the analysis software 501 compares the paper type required for printing identified by the analysis of the received print job with the acquired paper information 611 and requests the management software 502 to deliver paper information on lacking paper. In other words, the analysis software 501 firstly compares the paper information 611 with the required paper type for the printing operation.

Depending on the result of the comparison, when the analysis software 501 determines that the paper type required for the printing operation is not included in the paper information 611, the analysis software 501 requests the management software 502 of the server apparatus 106 to deliver paper information on lacking paper to the image forming apparatus 102.

In step S613, the management software 502 receives the request from the analysis software 501 and sends the requested paper information 614 to the image forming apparatus 102. In step S615, the control software 503 operating in the image forming apparatus 102 receives the request from the management software 502 and adds the received paper information 614 to the internal paper information definition.

In step S616, based on the type and number of sheets of paper required for the printing operation calculated in step S607 and the configuration information of the image forming unit 102 acquired in step S608, the analysis software 501 determines an allocation of paper type and paper feed units. The details of these processing operations will be described below.

Next in step S617, the analysis software 501 prepares a new JDF' 513 adding to the JDF 505 to include the allocation information regarding paper type and paper feed unit in the image forming apparatus 102 determined in step S616. Then in step S618, the analysis software 501 finally sends the print job configured as printing data 504 and a JDF' 513 to the image forming apparatus 102.

The control software 503 in the image forming apparatus 102 receives the print job sent by the analysis software 501 in step S619.

In step S620, the control software 503 extracts the allocation of paper type and paper feed units included in the job definition format JDF' 513 included in the received print job and creates an allocation of paper information and paper feed units in the image forming apparatus 102. Next in step S621, the control software 503 displays allocation information for the paper type and paper feed unit defined in JDF' 513 on the operation unit 201 of the image forming apparatus 102.

Next, the control software 503 detects whether the displayed paper feed unit has been opened and closed and updates the display on the operation unit 201 for paper feed units which have been opened and closed. Then in step S622, the control software 503 waits until the paper feed units required for printing the print job are detected to be opened and closed. The opening and closing detection process in step S622 will be described in detail below.

In step S623, the control software 503 finally completes the series of printing processes by printing the print job received in step S619.

Figure 7:
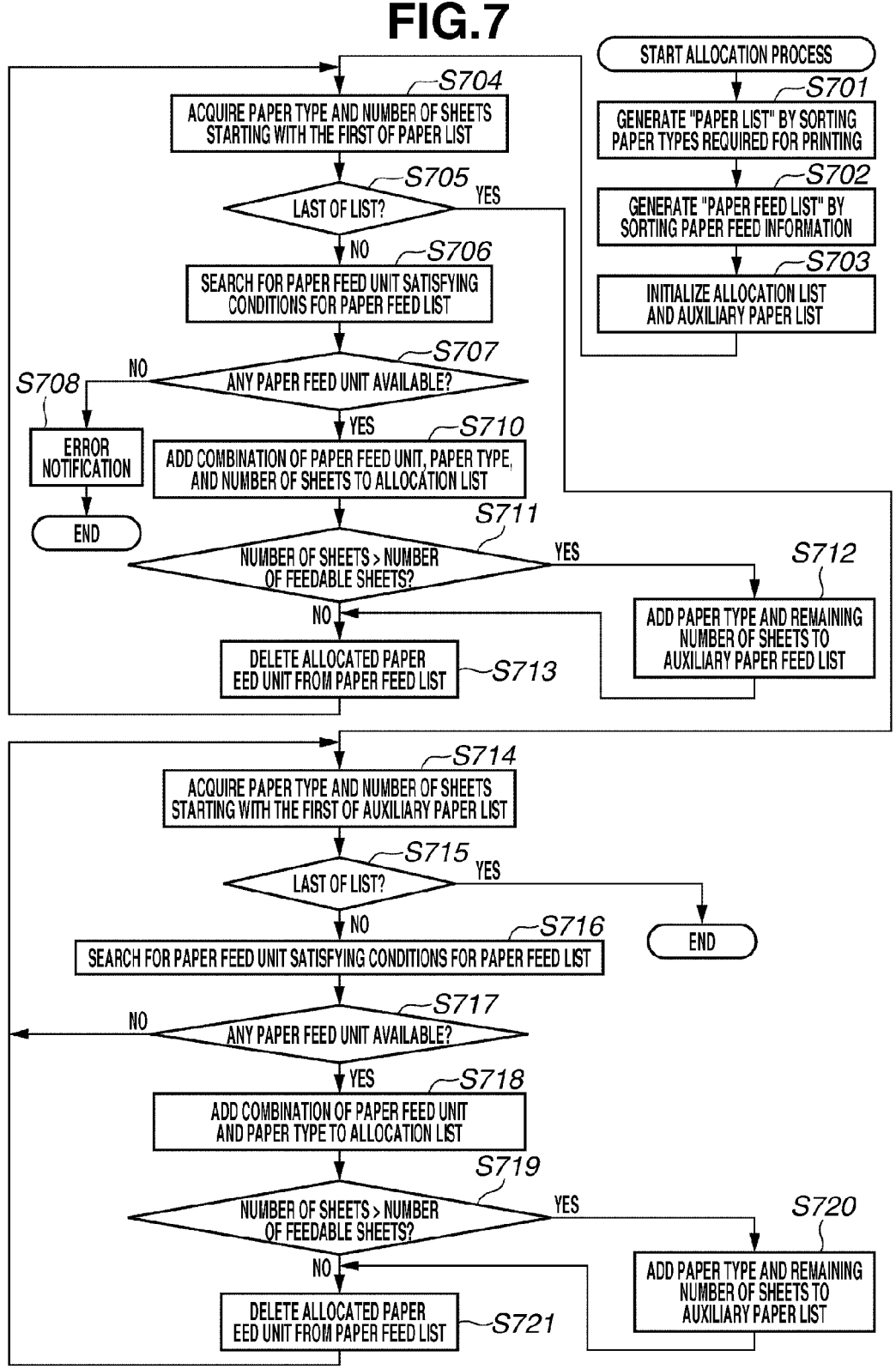
FIG. 7 is a flowchart illustrating an example of data processing in an information processing apparatus.

FIG. 7 is a flowchart illustrating an example of data processing in an information processing apparatus according to the present exemplary embodiment. This example describes processing by which the analysis software 501 of the host computer 103 in step S616 determines the allocation of a paper type required for printing of a print job and a paper feed unit in the image forming apparatus 102. Each step is realized by the CPU 302 of the host computer 103 functioning as an information processing apparatus by executing the analysis software 501 loaded on the RAM 303.

A paper feed unit of the image forming apparatus 102 which can supply paper of a certain size is assumed to be able to supply paper of a smaller size.

For example, a paper feed unit capable of supplying A3 size paper can also supply A4 size paper. FIG. 8B illustrates an example of paper feed information for a paper feed unit in the image forming apparatus 102 and the required paper information and number of sheets for printing a print job.

During the process by which the analysis software 501 determines a paper feed unit and paper allocation illustrated in step S616, firstly, in step S701, the analysis software 501 prepares "print job paper information" as illustrated in FIG. 8A, which rearranges the paper information required for printing in descending order of paper size and then in descending order of required number of sheets. The prepared "print job paper information" is hereafter termed "paper list".

Then in step S702, the analysis software 501 prepares a list which rearranges the paper feed unit information for the image forming apparatus 102 in ascending order of maximum feedable paper size and then in ascending order of number of feedable sheets. The prepared list is the "paper feed information for paper feed unit of image forming apparatus" as illustrated in FIG. 8B and is referred to below as "paper feed list". In the present exemplary embodiment, the image forming apparatus 102 is provided with seven paper feed units being the left deck upper, the left deck lower, the right deck upper, the right deck lower, the tray upper, the tray middle, and the tray lower. FIG. 8B illustrates a maximum paper size feedable by each paper feed unit as "A4" and the number of sheets capable of storage in respective paper feed units as a set figure.

Next in step S703, the analysis software 501 initializes the allocation list including the allocation of the paper feed units and paper required by the allocation process in step S616 and the auxiliary paper feed list required for processing when the required number of sheets of a specified paper type cannot be satisfied by a single paper feed unit and the paper supply not be sufficient. These respective lists are hereafter termed "auxiliary paper feed list" (refer to FIG. 8C) and "allocation list" (refer to FIG. 8D).

In the allocation process in step S616, the process in steps S704 to S713 is repeated starting with the first of the paper list illustrated in FIG. 8A in sequence until the last of the list.

Firstly, in step S706, the analysis software 501 searches the configuration information acquired from the server apparatus 106 for paper feed units capable of feeding the number of sheets and paper size acquired from the paper list. The details of the searching process are described below.

Then in step S707, the analysis software 501 uses the search results to determine whether the search of paper feed units enabling paper feed of the target paper is successful. When the analysis software 501 determines that feed units enabling paper feed of the target paper cannot be found, in step S708, notification is performed by displaying an error on the image forming apparatus 102 indicating that the target print job cannot be printed and the processing is terminated. A display to that effect is shown on the operation unit 203 of the image forming apparatus 102.

Conversely, in step S707, when the analysis software 501 determines that the search results identify a feed unit enabling paper feed of the target paper, then in step S710, the analysis software 501 adds the combination of number of sheets and type and the detected paper feed unit to the allocation list illustrated in FIG. 8D.

Then, in step S711, the analysis software 501 compares the number of sheets extracted in step S704 with the number of feedable sheets of the detected paper feed unit and determines whether the number of sheets is larger. When the analysis software 501 determines that the number of sheets is larger, then in step S712, the analysis software 501 stores the difference and the paper type in the auxiliary paper feed list illustrated in FIG. 8C.

As described hereafter, when the target paper cannot be fed from a single paper feed unit, if possible, an allocation is executed during the processing of the print job so that paper feeding is performed by a plurality of paper feed units. In this manner, even if a supplemental process is required in a single paper feed unit, use of the paper feed units set in the auxiliary paper feed list enables a setting which avoids interruption to the printing process due to supplementing paper.

Finally, in step S713, the analysis software 501 deletes the paper feed unit allocated in step S710 from the paper feed list illustrated in FIG. 8B, and the processing returns to step S704 to process the next row of the paper list.

In this manner, when processing of all of the rows of the paper list is completed, the processing proceeds to step S714, and in steps S714 to S721, an allocation process is executed for the paper feed units with respect to the paper stated in the auxiliary paper feed list illustrated in FIG. 8C.

Firstly in step S714, the analysis software 501 extracts a combination of number of sheets and type in order starting with the first of the auxiliary paper feed list. Then in step S715, the analysis software 501 determines whether the last of the list has been reached. When the analysis software 501 determines that the last of the list has been reached, the processing is terminated.

On the other hand, in step S715, when the analysis software 501 determines that the last of the list has not been reached, then in step S716, the analysis software 501 searches for a paper feed unit capable of feeding paper in combination with the acquired type of number of sheets of paper in the same manner as in step S706.

Then in step S717, the analysis software 501 determines whether a paper feed unit capable of feeding the target paper in the auxiliary paper feed list in FIG. 8C has been found. When the analysis software 501 determines that a paper feed unit capable of supplying the target paper cannot be found, the processing returns to step S714 to process the next row in the auxiliary paper list.

On the other hand, in step 717, when the analysis software 501 determines that a paper feed unit capable of feeding the target paper in the auxiliary paper feed list in FIG. 8C has been found, the processing proceeds to step S718. In step S718, the analysis software 501 adds and records the combination of target paper type and paper feed unit searched in the allocation list as illustrated in FIG. 8D.

Then in step S719, the analysis software 501 determines whether the given number of sheets is larger than the number of sheets which can be fed by the searched paper feed units.

When the analysis software 501 determines that the given number of sheets is greater than the number of feedable sheets from the searched paper feed unit, the processing proceeds to a step S720. In the step S720, the analysis software 501 adds the combination of a number of sheets in which the number of feedable sheets is subtracted from the given number of sheets and the given paper type to the footer of the auxiliary paper list and the processing proceeds to step S721.

On the other hand, in step S719, when the analysis software 501 determines that the given number of sheets is less than the number of feedable sheets of the searched paper feed unit, the processing proceeds to step S721. In step S721, the analysis software 501 deletes the paper feed unit added to the allocation list in step S718 from the paper feed list, the processing returns to step S714 to process the next row of the auxiliary paper list.

In the above process, since a list of allocation of paper feed unit and paper type is prepared in the allocation list illustrated in FIG. 8D, the allocation process repeats that list at the next steps and the process is terminated.

FIG. 8A to FIG. 8D illustrate an example of management information stored by the information processing apparatus. In this example, FIG. 8A illustrates a list of the number of sheets of paper type required for printing the print job. FIG. 8B illustrates a list of the paper feed information for the paper feed unit of the image forming apparatus. FIG. 8C illustrates the generated auxiliary paper list and FIG. 8D illustrates the list (paper allocation information) indicating the final paper allocation results.

FIG. 9 is a flowchart illustrating an example of a data processing sequence in the information processing apparatus according to the present exemplary embodiment. This example describes the process (detailed processing example in step S706) of searching for a paper feed unit that can supply paper with the paper type and number of sheets given in the steps S706 and S716 as illustrated in FIG. 7. Each step is implemented by the CPU 401 of the host computer 103 functioning as an information processing apparatus executing a control program loaded on the RAM 303.

Firstly in step S901, the analysis software 501 initializes the region for search results as empty. Then in step S902, the analysis software 501 extracts paper feed information from the first of the paper supply list illustrated in FIG. 8B.

Then in step S903, the analysis software 501 determines whether the paper feed information is extracted from the first to the last of the paper feed list. When the analysis software 501 determines that the paper feed information is extracted starting from the first to the last of the paper feed list, the processing proceeds to step S910. In step S910, the analysis software 501 returns the search results to the image forming apparatus 102 and the process is terminated.

On the other hand, in step S903, when the analysis software 501 determines that the process on the overall paper feed list is not completed, the processing proceeds to step S904.

In step S904, the analysis software 501 determines whether the paper size feedable from the paper feed unit acquired from the paper feed list is smaller than the paper size given in the paper list. When the analysis software 501 determines that feedable paper size is smaller than the given paper size, the processing returns to step S902 to process the next row of the paper feed list.

On the other hand, in step S904, when the analysis software 501 determines that feedable paper size is not smaller than the given paper size, the processing proceeds to step S905. In step S905, the number of feedable sheets for each paper feed unit is compared with the requested target number of sheets, and when the analysis software 501 determines that the number of feedable sheets of is higher than or equal to the target number of sheets, the processing proceeds to step S909, in which the analysis software 501 stores the paper feed information as a search result in the RAM 303, and the processing then proceeds to step S910.

On the other hand in step S905, when the number of feedable sheets is compared with the target number of sheets and the analysis software 501 determines that the number of feedable sheets is less than the target number of sheets, then in step S906, the analysis software 501 determines whether search results are not stored (empty state). When the analysis software 501 determines the search results are empty, the processing proceeds to step S908. In step S908, the analysis software 501 stores the paper feed information as a search result and the processing returns to step S902 to process the next row.

On the other hand, in step S906 when the analysis software 501 determines that the search result is not empty, the processing proceeds to step S907.

In step S907, the number of feedable sheets for the paper feed units included in the search result is compared with the number of feedable sheets of the paper feed units extracted in step S902, and the analysis software 501 determines whether the number of feedable sheets in the search result is higher than or equal to the extracted number of feedable sheets. When the analysis software 501 determines that the number of feedable sheets in the search results is higher than or equal to the extracted number of feedable sheets, the processing returns to step S902 to process the paper feed list.

On the other hand, in step S907, when the analysis software 501 determines that the number of feedable sheets in the search results is not higher than or equal to the extracted number of feedable sheets, the processing proceeds to step S908. In step S908, the analysis software 501 stores the paper feed information extracted in step S902 as a search result and the processing returns to step S902 to process the paper feed list.

These results in the present exemplary embodiment provide a linkage between the paper and the paper feed unit so that paper replacement operations for a paper feed unit are reduced during the printing process of the print job.

Figure 10:
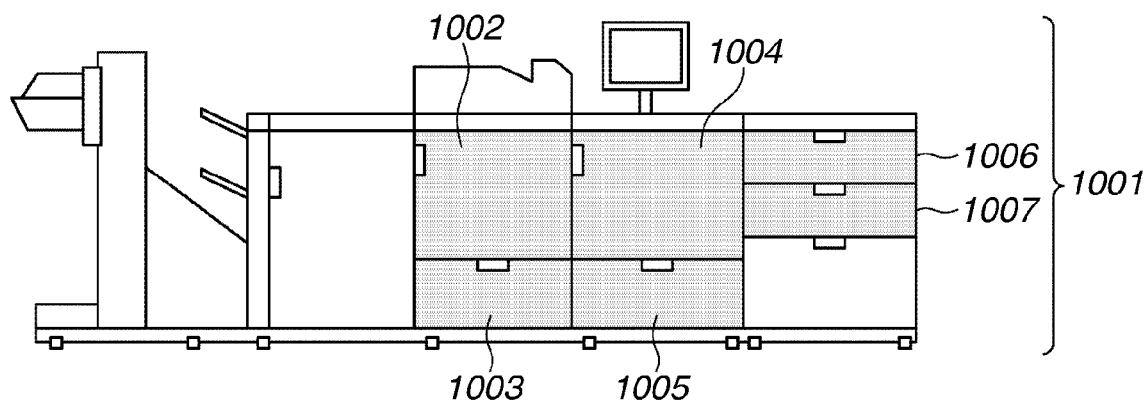
FIG. 10 illustrates an example of a user interface for the image forming apparatus in FIG. 1.

FIG. 10 illustrates an example of a user interface for the image forming apparatus 102 in FIG. 1. This example describes the allocation display of the paper and the paper feed unit required for printing the print job as shown on the operation unit 201 of the image forming apparatus 102 in step S621. The display state is not limited to the display example herein. The displayed information is based on paper feed information set in the JDF' 513.

In FIG. 10, 1001 denotes a display of the image forming apparatus itself and 1008 denotes an allocation list for the paper feed unit.

The control software 503 displays the paper feed units required for printing the print job received in the display 1001 of the image forming apparatus in a format which can be discerned by a user. At the same time, an allocation list for the paper and paper feed unit required for the allocation list 1008 is displayed. This display example indicates that six paper feed units of the total of seven paper feed units will be used to execute the print job.

The allocation list 1008 is configured by the paper feed unit name, the paper name, paper size, and required number of sheets. In this example, there is a match between the paper feed unit 1002 and the paper feed information 1009, the paper feed unit 1003 and the paper feed information 1010, the paper feed unit 1004 and the paper feed information 1011, the paper feed unit 1005 and the paper feed information 1012, the paper feed unit 1006 and the paper feed information 1013, and the paper feed unit 1007 and the paper feed information 1014.

Figure 11:
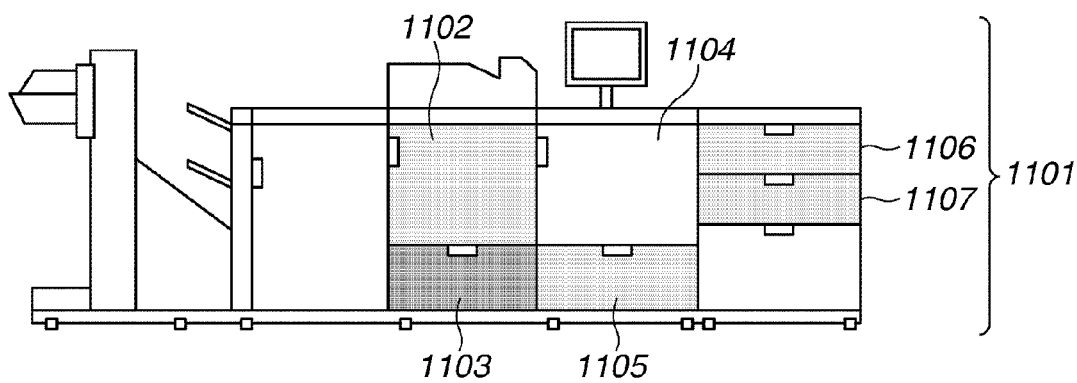
FIG. 11 illustrates an example of a user interface displayed on an operation unit of the image forming apparatus in FIG. 1.

FIG. 11 illustrates an example of a user interface displayed on an operation unit of the image forming apparatus 102 in FIG. 1. This example describes paper feed information allocating paper and a paper feed unit displayed on the operation unit 201 of the image forming apparatus 102 when a user opens or closes a paper feed unit to replace paper.

In FIG. 11, the control software 503 uses the output state of a sensor detecting whether each paper feed unit has been opened or closed, and displays the information in a format distinguishing between paper feed units which have not been opened and closed, paper feed units which are open, and paper feed units which are detected as to have been opened and closed.

In this example, the paper feed unit 1102, the paper feed unit 1105, the paper feed unit 1106, and the paper feed unit 1107 are paper feed units detected to have not been opened and closed. Since the paper feed unit 1103 is currently having paper replaced or supplemented, that unit is open. The paper feed unit 1104 is a paper feed unit detected as having been opened and closed. The display of the paper feed information in the allocation list 1008 is controlled so that the display configuration differs in response to the opened/closed state described above.

Figure 12:
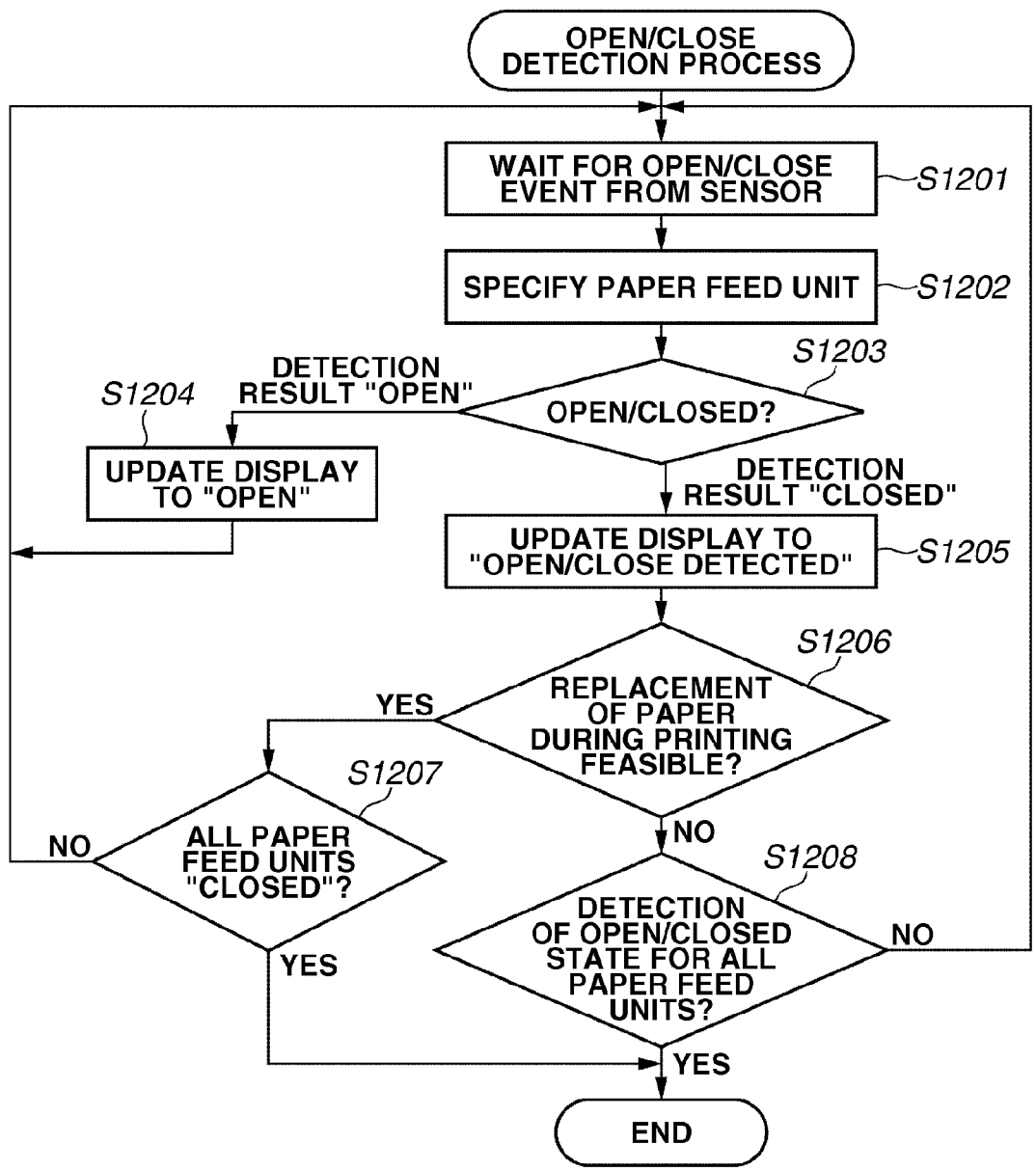
FIG. 12 is a flowchart illustrating an example of data processing in the image forming apparatus.

FIG. 12 is a flowchart illustrating an example of data processing in the image forming apparatus according to the present exemplary embodiment. The present example describes the process of detecting an opened or closed state executed when a sensor provided in the paper feed unit detects an opened or closed state of the paper feed unit. Each step is implemented by the CPU 401 executing a control program loaded on the RAM 403.

When the sensor detects an opened or closed state of a paper feed unit, an event is generated with respect to an opened or closed detection process. In step S1201, the CPU 401 waits for an opening or closing event from a paper feed unit and when an event is detected, then in step S1202, the CPU 401 specifies which paper feed unit has produced the event.

In step S1202, after specifying the paper feed unit, in step S1203, the CPU 401 determines whether the event is an "opening" or "closing" event of the paper feed unit. When the CPU 401 determines that the event is an "opening" event, then in step S1204, the display of the operation unit 201 is updated, the display of the target paper feed unit is updated to "open" and the processing returns to step S1201.

In the example illustrating a user interface in FIG. 11, the paper feed unit 1103 and the paper feed information 1110 indicate that the paper feed unit is open. When the event indicates "closed", then in step S1205, the CPU 401 updates the display on the operation unit 201 to display completion of an opening or closing detection for the target paper feed unit.

In the example illustrating a user interface in FIG. 11, the paper feed unit 1104 and the paper feed information 1111 indicate completion of an opening or closing detection for a paper feed unit.

Next, in step S1206, the CPU 401 determines whether the image forming apparatus 102 allows a paper replacement operation during printing. When the CPU 401 determines that paper replacement is not possible during printing, the processing proceeds to step S1208.

In step S1208, the CPU 401 detects the open or closed state of all paper feed units and determines whether all paper feed units are "closed". When the CPU 401 detects the open or closed state of all paper feed units and determines that all paper feed units are not "closed", the processing returns to the event waiting step in step S1201.

On the other hand, in step S1208, when the CPU 401 detects the open or closed state of all paper feed units and determines that all paper feed units are "closed", the processing is terminated.

On the other hand, in step S1206, when the CPU 401 determines that paper replacement is possible during printing, the processing proceeds to a step S1207. In step S1207, the opened or closed state of paper feed units all having the combination of paper sizes and types required for the print job is detected and the CPU 401 determines whether all these paper feed units are "closed". When the CPU 401 determines that all these paper feed units are "closed", the processing is terminated.

On the other hand, in step S1207, when the CPU 401 determines that all these paper feed units are not "closed", the processing returns to the event waiting step in step S1201.

For example, as shown in the example illustrated in FIG. 11, since "right deck upper" and "tray middle" are both allocated "A4" size and "normal paper Company B", when the state after detection of the open or closed state of all other paper feed units is "closed", the detection of either one of the paper feed units is "closed" and the detection process for an open or closed state is terminated.

As shown in the above description, the analysis hardware 501 automatically determines the allocation of the paper and paper feed unit required for the given print job and adds allocation information to the print job.

The image forming apparatus displays the combination of paper and paper feed unit set for the print job on the operation unit, and with the detection of the open or closed state for the set paper feed unit, initiates the printing of the given print job. In other words, the execution of the print job is suppressed until detection of an opening or closing operation on the set paper feed unit or paper replacement or supplementation by a user.

These processes enable execution of the print job without a user taking the combination of paper and paper feed unit into consideration and furthermore enables a reduction in the occurrence of paper running out during printing operations.

A second exemplary embodiment differs from the first embodiment with respect to the points described hereafter.

In step S601 illustrated in FIG. 6 in which configuration information is acquired by the management software 502, the type of paper allocated to the current paper feed unit is acquired at the same time. Furthermore, during step S608 in which the analysis software 501 acquires the configuration information and step S609 in which the management software 502 sends the configuration information, the paper type allocated to the current paper feed unit is sent at the same time.

In step S616, the analysis software 501 allocates the paper and the paper feed unit by calculating an allocation which reduces any variation to the current paper feed unit and paper allocation acquired in the above process.

In step S621 in which the control software 503 displays allocation information on the operation unit and step S622 in which an open or closed condition of the paper feed units is detected, paper feed units without a variation to their allocation are identified. Since the other basic configuration is similar to the first exemplary embodiment, the description hereafter of units common to the first and second exemplary embodiments will use the same reference numerals and figures as in the first exemplary embodiment.

Figure 13:
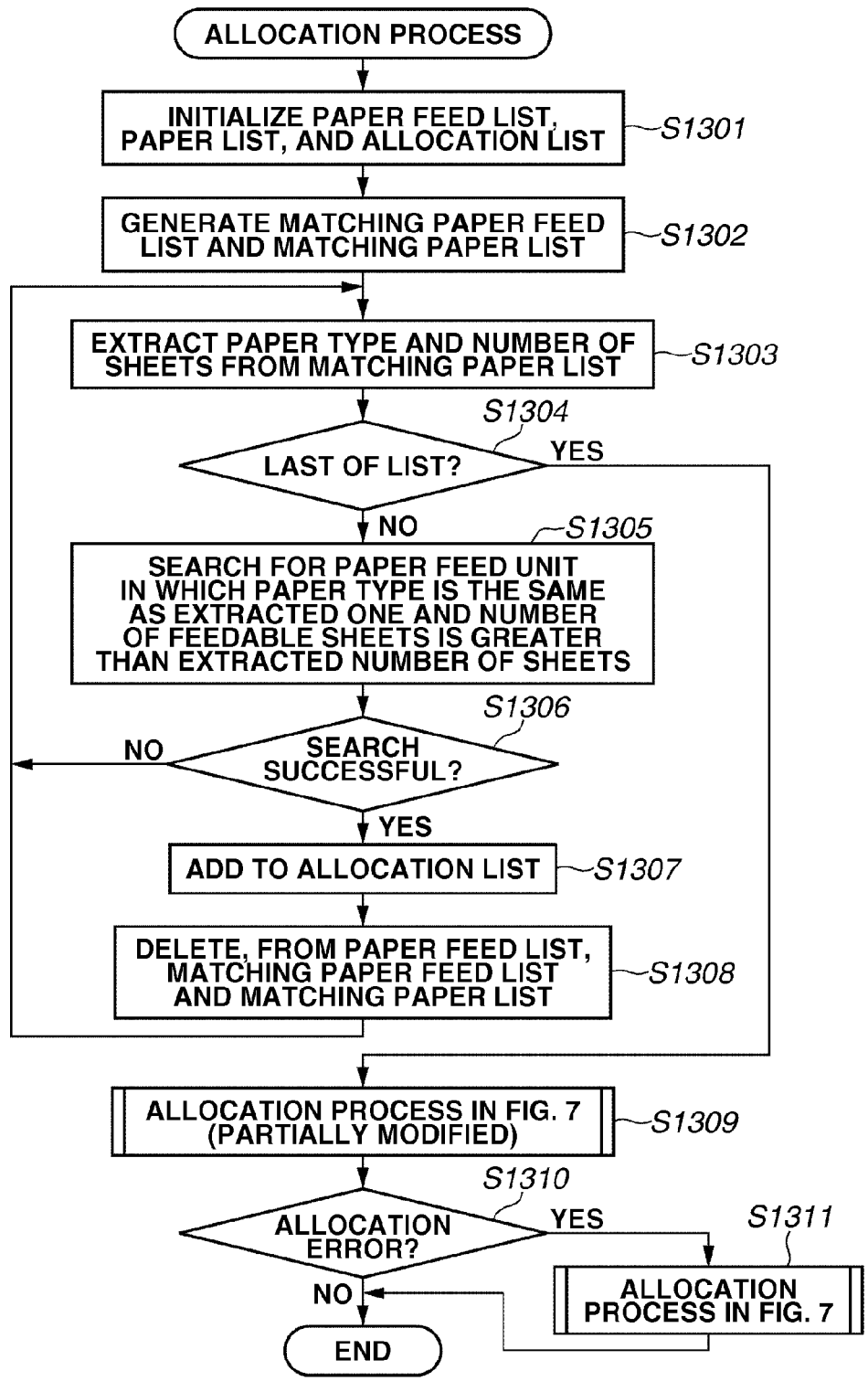
FIG. 13 is a flowchart illustrating an example of a data processing sequence in the image forming apparatus.

FIG. 13 is a flowchart showing an example of the data processing sequence in an information processing apparatus according to the present exemplary embodiment. This example describes an allocation process for paper and paper feed units performed by the analysis software 501 installed in the host computer 103 illustrated in FIG. 1. Each step is implemented by the CPU 302 executing the analysis software 501 loaded on the RAM 303.

Firstly in step S1301, the CPU 302 in the host computer 103 executes the analysis software 501 and initializes the paper feed list, paper list and allocation list for paper type and paper feed unit managed in the RAM 303. The paper feed list reproduces the paper type and number list required for printing the print job calculated by the analysis software 501 during the analysis of printing data in step S607 illustrated in FIG. 6.

The paper feed list reproduces the information list related to the paper feed unit calculated by the analysis software 501 during the acquisition of configuration elements in step S608 illustrated in FIG. 6. The paper feed list includes the paper feed unit name, the maximum feedable paper size, the number of feedable sheets, the paper type, and the paper size. An example of a paper feed list is illustrated in FIG. 14A to FIG. 14D.

FIGS. 14A to 14D illustrate an example of a paper feed information list for the image forming apparatus managed by the information processing apparatus according to the present exemplary embodiment. This example is initialized in step S1301 illustrated in FIG. 13.

Then in step S1302, the analysis software 501 prepares respective lists in which the paper type required for printing the print job matches the paper type currently allocated to the paper feed unit of the image forming apparatus.

Hereafter the matching paper type list is referred to as a "matching paper list" and the matching paper feed unit list is referred to as a "matching paper feed list". FIG. 14B illustrates an example of a "matching paper feed unit list" and FIG. 14C illustrates an example of a "matching paper list". In this example, the paper type and number of sheets of paper required for printing the print job is the same as the details illustrated in FIG. 8A to 8D.

Then in step S1303, the paper type is acquired from the matching paper list and the process in steps S1304 to S1308 as illustrated in FIG. 14C is repeated for each paper type.

Firstly in step S1304, the analysis software 501 determines whether the acquired paper type is the last of the matching paper list. When the analysis software 501 determines that it is the last, the processing proceeds to step S1309.

On the other hand, in step S1304, when the analysis software 501 determines that it is not the last, the processing proceeds to step S1305.

In step S1305, the analysis software 501 searches the matching paper feed list in FIG. 14B for a paper fed unit in which the paper type is the same as the extracted paper type and the number of feedable sheets is greater than the extracted number of sheets.

Then in step S1306, the analysis software 501 determines whether the searching operation for the relevant paper feed unit has been successful.

When the analysis software 501 determines that the searching operation for the relevant paper feed unit has not been successful, the processing returns to step S1303 to process the next paper in the matching paper list.

In step S1306, when the analysis software 501 determines that the searching operation for the relevant paper feed unit has been successful, in other words, that a relevant paper feed unit has been found, then in step S1307, the combination of the paper type and the paper feed unit searched for by the analysis software 501 is added to the allocation list illustrated in FIG. 14D.

Then in step S1308, the paper type and the paper feed unit searched for by the analysis software 501 are respectively deleted from the paper feed unit list illustrated in FIG. 14A and the matching paper feed list and matching paper list illustrated in FIG. 14B. The processing then returns to step S1303 to process the next paper in the matching paper list.

When this process has been completed for all matching paper lists, the process is terminated in step S1304 and the processing returns to step S1309.

In step S1309, the analysis software 501 initiates the allocation process for remaining paper and paper feed units. Since this allocation process is the same as the allocation process illustrated in FIG. 7 with the exception of the points below, detailed description will not be repeated.

In step S1309, the paper list prepared in step S701 illustrated in FIG. 7 is prepared using the matching paper list above. The paper feed list prepared in step S702 is prepared using the matching paper feed list above.

The initialization of the allocation list from step S703 is not performed and the allocation list illustrated in FIG. 14D is used. Furthermore, an error notification provided in step S708 is not executed, and an error notification is sent to the invoker.

Then in step S1310, the analysis software 501 determines whether the invoking result for the allocation process in step S1309 is an error. When the analysis software 501 determines that the invoking result is a failure (error), the processing proceeds to step S1311. In step S1311, the analysis software 501 invokes the allocation process illustrated in FIG. 7, returns the result, and terminates the process.

In step S1310, when the analysis software 501 determines that the invoking result has been successful, the current process is terminated.

In this manner, a final allocation list as illustrated in FIG. 14D is produced.

Figure 15:
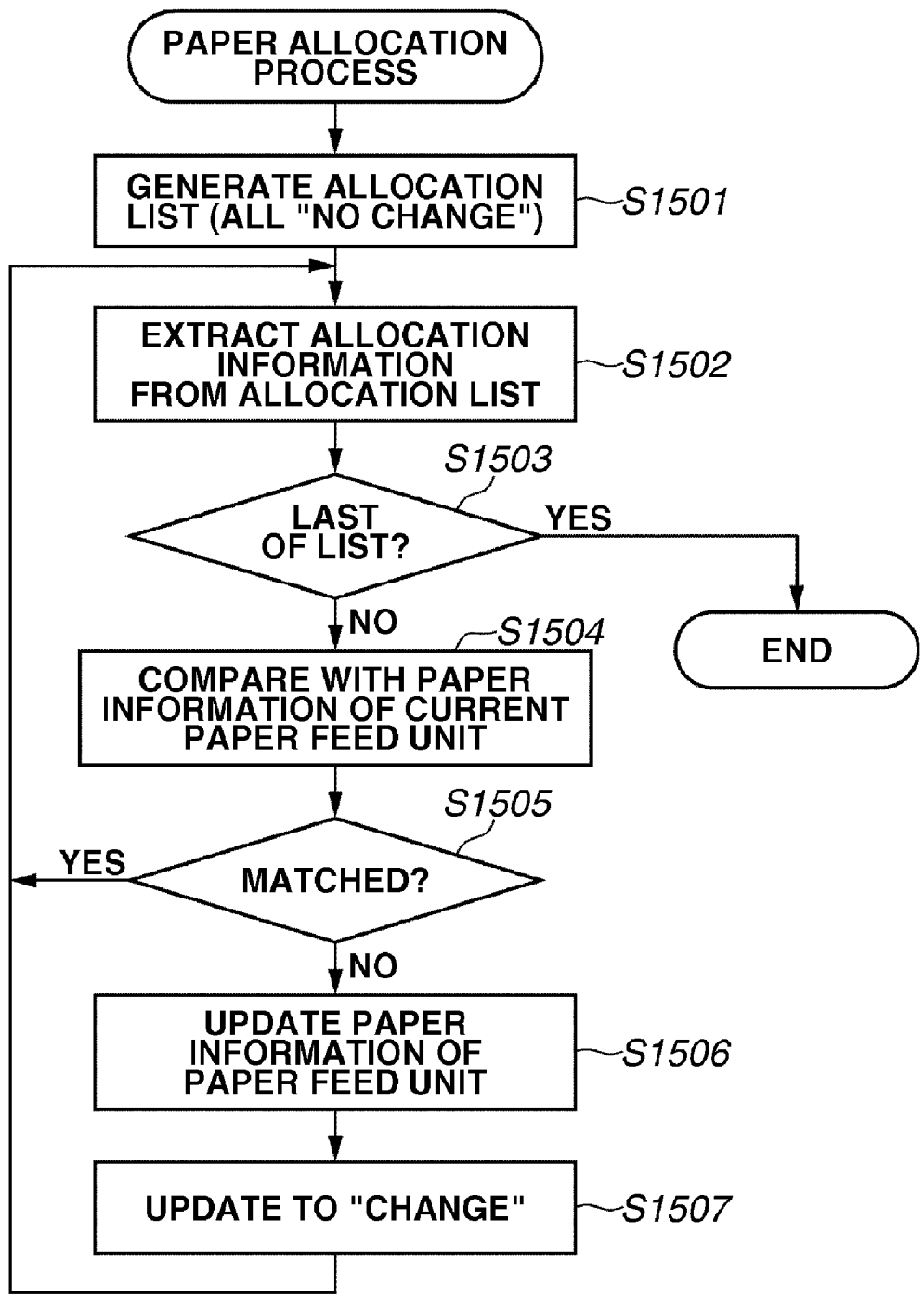
FIG. 15 is a flowchart illustrating an example of a data processing sequence in the image forming apparatus.

FIG. 15 is a flowchart illustrating an example of a data processing sequence in an image forming apparatus according to the present embodiment. This example describes a paper allocation process (corresponding to step S620 in FIG. 6) to a paper feed unit by the control software 503 installed in the image forming apparatus 102 illustrated in FIG. 5. Each step is implemented by the CPU 401 by executing the control software 503 stored in the hardware 405 and loaded on the RAM 403.

In step S1501, the control software 503 executed by the CPU 401 uses paper feed unit and paper allocation information included in the JDF 513 of the print job to prepare an allocation list illustrated in the example in FIG. 16. The allocation list illustrated in FIG. 16 includes paper feed unit name, paper type, paper size, number of sheets, and state. The initial value of the location list state is "no change".

Next, in step S1502, the control software 503 extracts allocation information from the allocation list illustrated in FIG. 16. In step S1503, the control software 503 determines whether the extracted allocation information is the last of the allocation list. When the control software 503 determines that the extracted allocation information is the last of the allocation list, the process is terminated.

On the other hand, when the control software 503 determines that the extracted allocation information is not the last of the allocation list, the processing proceeds to step S1504. In step S1504, the control software 503 compares the allocation for paper type and size for the paper feed units in the extracted allocation information to see whether it is equal to the current allocation to the image forming apparatus 102.

In step S1505, the control software 503 determines whether the comparison results match. When the control software 503 determines that the comparison results are equal, the processing returns to step S1502 and processing operations are continued.

On the other hand, in step S1505, when the control software 503 determines that the comparison results do not match, the processing proceeds to step S1506. In step S1506, the control software 503 allocates the paper type extracted in step S1502 to the paper feed units extracted in step S1502 to update the paper information for the paper feed units.

Then in step S1507, the control software 503 updates the state of the allocation list to "change", the processing returns to step S1502 and the processing operations are continued.

In step S1503, when processing of all rows of the allocation list has been completed, the allocation list prepared as illustrated in FIG. 16 is returned and the processing is terminated.

Figure 17:
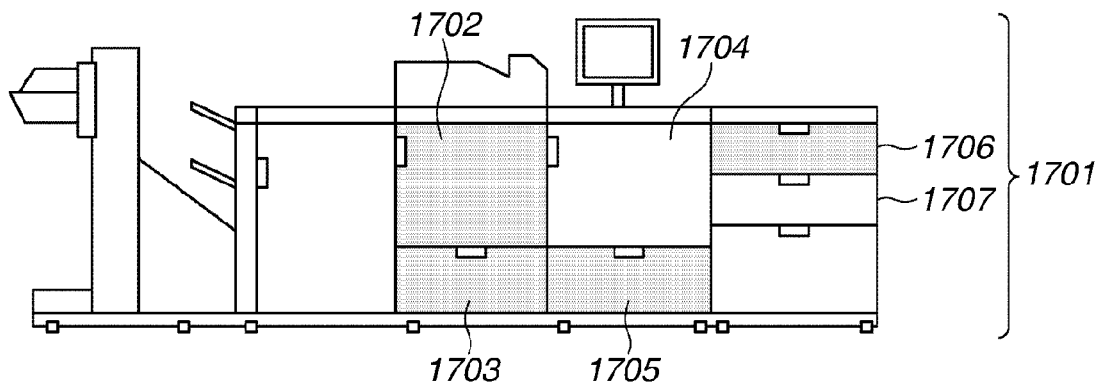
FIG. 17 illustrates an example of a user interface in the image forming apparatus.

FIG. 17 illustrates an example of a user interface in an image forming apparatus according to the present exemplary embodiment. The present example describes information allocation for a paper feed unit and paper displayed on the operation unit 201 of the image forming apparatus 102.

In FIG. 17, the display process in step S621 illustrated in FIG. 6 displays the paper feed units by discriminating between paper feed units having a varied paper information allocation and the paper feed units without any change. More specifically, the display makes a distinction between the varied paper feed information on paper type, size, and number for the paper feed units (1709, 1710, 1712, 1713) and the paper feed information for paper feed units only requiring paper replacement (1711, 1714).

Display control may include various forms of display by use of different color to discriminate between paper feed units not requiring paper replacement, paper feed units requiring only supplementary paper, and paper feed units requiring a change in paper type.

In the present exemplary embodiment, the opened or closed checking process for the paper feed units performed by the control software 503 in step S622 in FIG. 6 is similar to the process illustrated in FIG. 12 with the exception of the following points.

Figure 18:
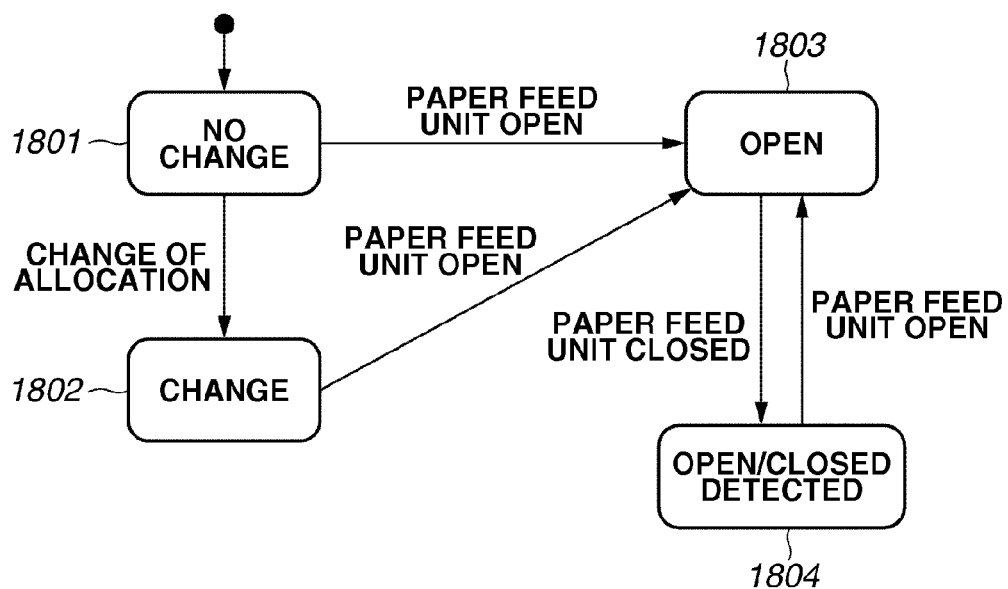
FIG. 18 illustrates a transition of items in the allocation list illustrated in FIG. 16.

In the process performed in step S1204 in FIG. 12, the state of the allocation list is updated to "open" shown by the state 1803 in FIG. 18. Furthermore, in the process in step S1205, the state of the allocation list is updated to opened or closed corresponding to a state 1804. The transition to the final state in step S1207 is performed by detecting that the state of all of the different combinations of paper type and size in the allocation lists are "open/closed detected" or "no change".

For example, the example of an allocation list illustrated in FIG. 16 allocates the same paper type and size to "left deck upper" and "tray upper".

In this case, when either of these paper feed units is "no change" or "open/closed detected", and the state of the other paper feed units is "no change" as in the initial state 1801 or "open/closed detected" in the state 1804 as illustrated in FIG. 18, the open or closed checking process illustrated in step S622 shifts to a final state even if the state of the "tray upper" for example is not "open/closed detected".

The transition to a final state in step S1208 as illustrated in FIG. 12 in the present exemplary embodiment is performed by detecting that the state of all allocation lists is "open/closed detected" or "no change".

FIG. 18 illustrates the transition between items in the allocation list illustrated in FIG. 16.

In FIG. 18, firstly an initial state 1801 is "no change". The paper allocation process in step S1506 illustrated in FIG. 15 updates the state to "change" corresponding to the state 1802 when there is a change to the paper allocation. Other aspects of the transition to another state are the same as those described above.

As described above, the analysis software in the information processing apparatus uses the current allocation information in the image forming apparatus to automatically determine the allocation of the paper feed units and the paper required for the given print job and sets the allocation information for the print job.

The image forming apparatus displays the combination of paper and paper feed unit set for the print job on the operation unit, waits for the detection of an opening or closing operation on the set paper feed unit, and initiates printing of the print job.

The image forming apparatus stores the changes from the immediately previous combination of paper feed unit and paper, and when an opening or closing operation of the paper feed unit is detected, paper feed units without change are deleted from the units monitored for opening or closing operations.

These processing operations enable a user to print a print job without considering the combination of paper and paper feed unit for the print job and reduces the need for paper replacement operations in the paper feed units. Furthermore the occurrence of paper running out during the print job can be reduced.

Each of the above exemplary embodiments has described analysis software provided on a host computer 103. However, the function of the analysis software 501 may be configured by storage in the image forming apparatus 102. Furthermore, the above exemplary embodiments have described the management by the server apparatus 106 of brand information for paper stored in a paper feed unit of the image forming apparatus 102. However, when brand information for paper is managed by the image forming apparatus 102, a configuration without the server apparatus 106 is possible.

Although the above exemplary embodiments have described the host computer 103 indicating the delivery of paper brands to the server apparatus 106, instead of indicating the delivery of all paper information, a configuration is also possible in which paper information on lacking paper is acquired by request to a management apparatus.

Since the management of fonts and color profiles is performed by the server apparatus 106, printing operations are feasible with enhanced reliability by outputting a request for delivery of required resources to the server apparatus 106 by the analysis software 501 of the host computer 103 or the image forming apparatus 102.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-271169 filed Oct. 21, 2008, which is hereby incorporated by reference herein in its entirety.

What is claimed is:

1. An image forming apparatus configured to process a print job received from an information processing apparatus using paper stored in a plurality of paper feed units, the image forming apparatus comprising:
    a display unit configured to, based on paper allocation information, display information about a paper feed unit used for processing the print job and information about paper to be stored in the paper feed unit, wherein the paper allocation information is information for associating each of the plurality of paper feed units with type and number of sheets of paper to be stored in the paper feed unit in such a way as to reduce replacement of paper based on type and number of sheets of paper required to be used for the print job and configuration information of the image forming apparatus;
    a detection unit configured to detect an opened and closed state of each paper feed unit; and
    a restriction unit configured to restrict initiation of printing of the print job until the detection unit detects an opening and closing of a paper feed unit requiring a replacement operation for paper corresponding to the paper allocation information during processing of the print job.

2. The image forming apparatus according to claim 1, wherein the information about paper displayed by the display unit includes type and number of sheets of paper.

3. The image forming apparatus according to claim 1, wherein the display unit is configured to display the information about a paper feed unit in such a way as to discriminate between a paper feed unit or units having a change of information about paper to be stored therein based on the paper allocation information and a paper feed unit or units having no change of information about paper to be stored therein.

4. The image forming apparatus according to claim 1, wherein the display unit is configured to display the information about a paper feed unit in such a way as to discriminate between a paper feed unit or units having a change of type of paper to be stored therein based on the paper allocation information, a paper feed unit or units requiring supplementation of paper, and a paper feed unit or units having no change of information about paper to be stored therein.

5. The image forming apparatus according to claim 1, further comprising an extraction unit configured to extract the paper allocation information from the print job.

6. The image forming apparatus according to claim 1, wherein, in response to the same type of paper being allocated to a plurality of paper feed units, the restriction unit is configured to restrict initiation of printing of the print job until the detection unit detects an opening and closing of any one of the plurality of paper feed units.

7. The image forming apparatus according to claim 1, wherein the restriction unit is configured to restrict initiation of printing of the print job until the detection unit detects an opening and closing of a paper feed unit having a change of information about paper to be stored therein based on the paper allocation information.

8. A job processing method for an image forming apparatus configured to process a print job received from an information processing apparatus using paper stored in a plurality of paper feed units, the job processing method comprising:

displaying, based on paper allocation information, information about a paper feed unit used for processing the print job and information about paper to be stored in the paper feed unit, wherein the paper allocation information is information for associating each of the plurality of paper feed units with type and number of sheets of paper to be stored in the paper feed unit in such a way as to reduce replacement of paper based on type and number of sheets of paper required to be used for the print job and configuration information of the image forming apparatus;

detecting an opened and closed state of each paper feed unit; and restricting initiation of printing of the print job until detecting detects an opening and closing of a paper feed unit requiring a replacement operation for paper corresponding to the paper allocation information during processing of the print job.

9. A non-transitory computer readable storage medium storing a computer program for causing a computer to execute the job processing method according to claim 8.

* * * * *